Oct. 29, 1968  E. R. SCHRADER  3,408,619
SUPERCONDUCTIVE MAGNET HAVING GREASE BETWEEN
ADJACENT WINDING LAYERS
Filed Dec. 20, 1966
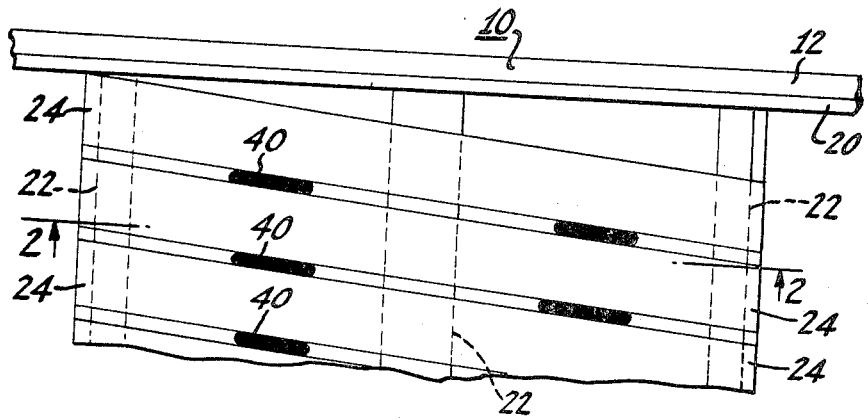
Fig. 1.
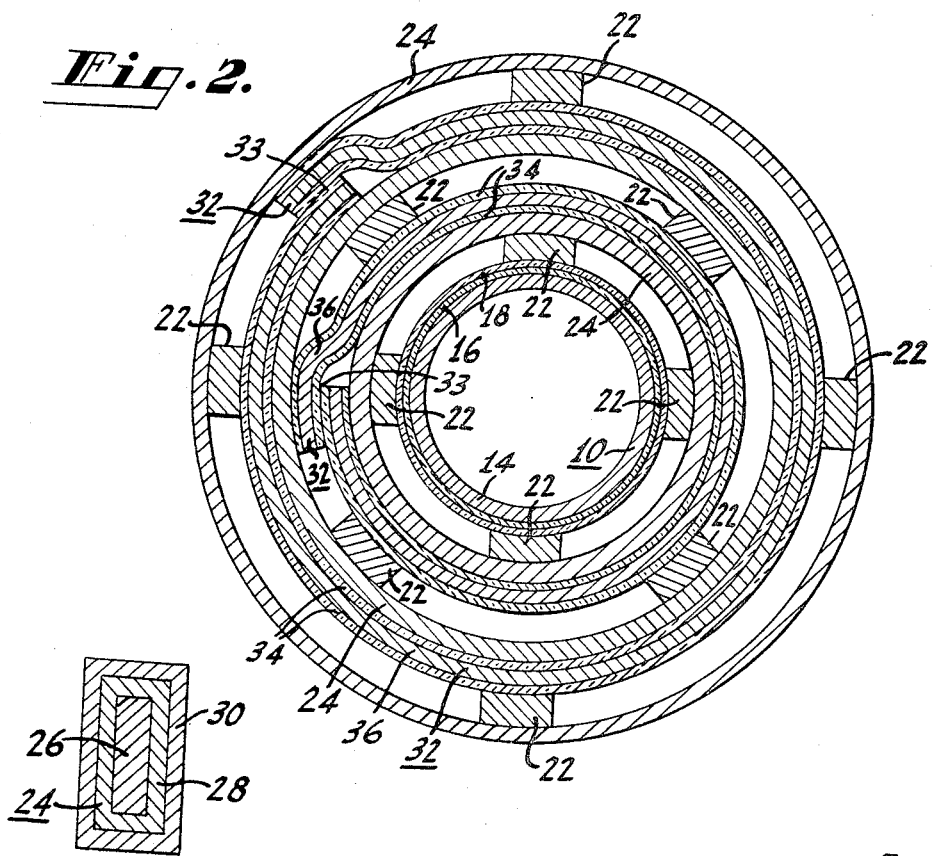
Fig. 2.
Fig. 3.
Inventor:
EDWARD R. SCHRADER
By Simon Yaffee
Attorney

United States Patent Office 3,408,619
Patented Oct. 29, 1968

3,408,619
SUPERCONDUCTIVE MAGNET HAVING GREASE BETWEEN ADJACENT WINDING LAYERS
Edward R. Schrader, Hightstown, N.J., assignor to Radio Corporation of America, a corporation of Delaware
Filed Dec. 20, 1966, Ser. No. 603,222
5 Claims. (Cl. 335—216)

This invention relates to the construction of superconductive magnets.

Superconductive magnets are constructed by winding a superconducting wire or ribbon on a supporting core. A superconductor at room temperature typically has a resistance that is high in comparison to that of copper or silver. At cryogenic temperatures, the superconductor exhibits zero resistance. An operating magnet can be produced by building up the current in the winding of the superconductive magnet to a desired value while the magnet is maintained at temperatures below the critical temperature of the material being used. However, due to various reasons such as flux motion while building up the current in the magnet, local thermal or electromagnetic disturbances may be produced in the superconductive winding that will cause a portion of the superconductor to become normal or, in other words, revert to its high resistance condition. When this happens, unless precautions are taken to prevent it, the whole magnetic field of the magnet collapses, resulting in possible damage to the magnet due to the developed large forces and high voltages. Also, when the superconductive magnet becomes normal unintentionally, the process of building up the field thereof must be gone through again. Furthermore, in superconductive magnets, when in a superconducting state, due to the great fields produced therein, great force is developed by the conductors comprising the winding thereof that tend to displace the conductors. The displacing of the conductors often causes a portion of the superconductive magnet to become normal thereby destroying its field and possibly damaging the magnet.

It is an object of this invention to provide an improved superconductive magnet.

It is another object to provide a superconductive magnet including improved stabilizing means for preventing the superconductors thereof from unintentionally becoming normal.

In accordance with the invention, grease which has good heat conducting properties and which is plastic at room temperatures is wiped in between adjacent turns of the superconducting winding of a superconducting magnet at several places around the circumference of each layer of the superconductive winding. This grease, at cryogenic temperatures, becomes rigid and prevents motion of the turns of the magnet and still conducts heat away from the windings. The grease may be used as a sole stabilization means in a magnet construction. Also, the grease may be used with other stabilization means in magnet construction, for example, in applications where normally conductive bars are positioned in contact with the turns of the superconductor winding in such a way as to effectively shunt adjacent turns of the winding and/or where conductive sheets which are insulated on both sides are positioned between adjacent layers of the superconductor winding.

The invention will be better understood when read in conjunction with the accompanying drawing, in which:

FIGURE 1 is a partial side elevational view of a superconductive magnet that is partially completed.

FIGURE 2 is a cross sectional view of a superconductive magnet constructed in a manner of that shown in FIGURE 1 and shows the cross sectional construction on the line 2—2 of FIGURE 1, and FIGURE 3 is a cross sectional view of one example of a superconductive ribbon that is suitable for winding the superconductive magnet of FIGURES 1 and 2.

As shown in FIGURES 1 and 2, a winding spool 10 is provided having a flange 12 at each end thereof (only one flange being shown) and having a central tube portion 14. This spool 10 may be of any material which is sufficiently physically strong as a core for the superconductive magnet to be wound thereon. The spool 10 is usually made of aluminum or stainless steel. As shown in FIGURE 2, one or more layers of insulation 16 and 18 are placed on the tube 14. While this insulation is shown as being cylindrical, it may actually be produced by winding a sheet of insulation on the tube 14 or by applying coatings to the tube 14. Also, a layer of insulation 20 is provided on the inside surfaces of the flanges 12.

Shorting bars 22 are laid on the insulation 18, these shorting bars being strips of copper, or any other good normal conductor that does not have superconducting properties. The shorting bars 22 are laid on the insulation 18 in such a direction that they each contact the turns of a layer of the winding of superconductor ribbon, to be described, in several places. As illustrated, the shorting bars 22 are laid on the insulation 18 in a direction parallel to the axis of the spool 10. The number and cross sectional area of the bars 22 are chosen so as to provide an alternate path for the current in a portion of a superconductor when that portion of the superconductor has gone normal. Since the shunt for the superconductive winding provided by the bars 22 is always present, even when the superconductive winding is in its superconducting state, the bars 22 will slow down any build up of current in the superconductor to the value required in normal operation of the superconducting magnet. If the resistance of the bars 22 is too low, it will take an unreasonable length of time to build up current in the superconductive magnet, to be described, to the desired value. In a practical superconductive magnet, the high conductivity copper bars 22 may be two thousandths of an inch thick and about one quarter of an inch wide. The bars 22 may be equally spaced around the circumference of a layer of turns of superconductor and they may be from three to five inches apart.

A superconductive ribbon or superconductor 24 is carefully wound in a helical manner from one end of the spool to the other over the bars 22. The superconductor 24 is wound with a uniform tension and in such a manner as to provide uniform distance between the adjacent edges of the turns. A connection (not shown) is made to one end of the ribbon 24, this connection extending out of the superconductive magnet beyond the flange 12. The ribbon 24 may comprise a stainless steel substrate 26 as shown in FIGURE 3, a layer of superconductive material 28 such as niobium stannide on the substrate 26, and a layer 30 of a normal conductor such as silver on the superconductive layer 28.

When a complete one conductor thick winding layer has been wound over the bars 22, a grease 40 (see FIGURE 1) which is soft and plastic at room temperature is wiped as with the finger or with a brush, across the winding layer in a direction parallel to the axis of the spool 10 and at circumferentially separated positions. The grease 40 is shown between the turns of superconductor 24 of the unfinished magnet of FIGURE 1, and it is not shown in FIGURE 2. However, the grease is applied to each layer of winding of the superconductor magnet between adjacent edges of the superconductor 24 comprising the layer. This grease should be hard, and have a high heat conductivity at cryogenic temperatures. It should be stable and not separate into its component parts at such temperatures. One example of a grease is Apiezon M or N sold by Apiezon Products Co., although any of a number of available vacuum greases having the above properties may be used.

A composite interlayer sheet 32 is next wound around the completed superconductor layer. The interlayer sheet 32 is overlapped for a short distance as shown at 33. This interlayer sheet comprises an insulating film 34, a sheet of conductor 36 which remains normal at cryogenic temperatures, such as copper, and another insulating film 34. Although the conductive sheet 36 extends for more than 360 degrees, a short is not completed thereby due to the fact that the overlapping portions of the sheet 36 are insulated from each other by the insulating films 34.

More shorting bars 22 are positioned on the composite interlayer sheet 32 and another layer of superconductive ribbon 24 is wound over the shorting bars 22. Grease 40 is wiped across the wound ribbon 24 in a direction parallel to the axis of the spool 10 and these steps are repeated until the magnet is completely wound, current and metering connections being made to the superconductive ribbon 24 where necessary in a known manner.

A superconductive magnet having the structural features herein described will have a reduced tendency to become normal during operation or during changing conditions such as change of current, of field or of temperatures. It is noted that the construction as viewed in FIGURES 1 and 2 has not been drawn to scale but is exaggerated for clarity of drawing.

The grease 40 prevents shift of the conductors 24 due to the axial forces present in the magnet. As stated above, this motion in itself may cause adjacent conductors 24 to become normal, and the grease therefore contributes to the stability of a superconductive magnet.

A portion or portions of the superconductor 24 may become normal as for example due to local heating produced by flux motion while the current flow through the superconductor 24 is being built up. The normally highly conductive bars 22 which contact the normally highly conductive coating 30 on the superconductor 24 comprising the windings of the magnet, act to shunt current around the normal portion or portions of the conductor 24. That is, if a small portion of a superconductor winding 24 becomes normal for any reason, whereby its resistance becomes high, current will flow around the normal portion of the superconductor 24 through the coating 30 and also through the conductive coating of adjacent turns of the superconductor and through the bars 22, until the small normal portion of the superconductor becomes superconductive again by heat being withdrawn therefrom by the cryogenic apparatus surrounding the magnet. Therefore, the shorting bars 22 also add to the stability of the superconductive magnet.

As is known, a superconductor when in normal condition has high resistance compared to copper or silver and it may become permeated with a magnetic field that is caused by a flowing current similar to other normal conductors. However, when a superconductor becomes superconductive, it has no resistance and also it resists penetration by a magnetic field. Therefore, as the current through a superconductor builds up, the magnetic field caused by the current flow does not easily penetrate the superconductor but it is crowded or concentrated in the volume of the magnet adjacent a superconductor comprising part thereof. As this field builds up, a critical value of field for the superconductive material used will be reached at which time the superconductor can no longer prevent penetration thereof by the field. The flux will then jump through the superconductor in an attempt to attain equilibrium in the volume of the magnet. As soon as the flux jumps through a portion of the superconductor, that portion can become normal and its resistance can then become high. The very high current flow in the superconductor would then cease to flow and the magnetic field produced thereby would collapse.

As noted above, when the flux jumps, it tends to equalize itself throughout the volume of the superconductive magnet. Therefore, during flux jump, the flux penetrating the interlayer conductive sheet 36 changes. Since eddy currents are induced in the copper sheet 36 by change of the magnetic field or flux therein, which oppose any change of flux therein, the flux jump is attenuated, that is, reduced in magnitude by the action of the copper sheet 36. This attenuation of the flux jump results in less probability of a portion of the superconductive magnet becoming normal. Therefore, the sheets 36 act to add stability to a superconductive magnet.

The insulating films 34 prevent the overlapping ends of the copper sheet 36 from contacting each other. Therefore, the copper sheet does not provide a short circuited turn. If the conducting sheet did not provide a short circuited turn (as when the insulating films 34 are not used) the time constant of the superconductive magnet including the sheets 35 would be increased, whereby the use of the films 34 makes it possible to build up the current in a superconductive magnet in a shorter period of time than if the films 34 were not used. Furthermore, the films 34 prevent short circuiting of the superconductors 24 comprising the adjacent layer of winding of the magnet by the copper sheet 36.

While only one embodiment of the improved superconductive magnet has been described, modifications thereof will suggest themselves to a person skilled in the art. For example, the superconductor 42 may be of any suitable cross sectional form other than the ribbon-like form disclosed. Similarly, a core 10 having no flange 12 or insulation 20, may be used. Only one layer of insulation 16 or 18 on the core 10 may be necessary. Or in fact if an insulating core 10 is used, no insulation on the core itself may be necessary. The description is therefore to be considered as illustrative, and not in a limiting sense.

What is claimed is:
1. A superconductive magnet comprising
   a layer of turns of a superconductor wound in a helical manner about an axis, said turns being spaced from one another along said axis, and
   grease between the turns of said superconductor, said grease being soft and plastic at temperatures above that at which the superconductor exhibits superconductive properties and becoming hard and having good heat transfer properties compared to that of superconductive material at temperatures below that at which said superconductor exhibits superconductive properties.
2. A superconductive magnet according to claim 1 including
   one of more shorting strips extending in a direction transverse to said turns, said strips being in electrical contact with a plurality of turns of said superconductor winding layer.
3. A superconductive magnet comprising
   a plurality of layers of turns of superconductor with each layer wound in a helical manner about an axis to provide an inner and one or more outer layers of turns,
   a separate conductive sheet positioned between each two adjacent layers of turns, said sheet including an insulating film between each side thereof and the adjacent layer of turns, and
   grease between the turns of said superconductor in each of said layers, said grease being soft and plastic at temperatures above that at which the superconductor exhibits superconductive properties and becoming hard and having good heat transfer properties compared to that of superconductive materials at temperatures below that at which said superconductor exhibits superconductive properties.
4. A superconductive magnet comprising
   a pluralilty of layers of turns of superconductor material,
   each layer being wound in a helical manner about an axis to provide an inner and one or more outer layers of turns, and grease between the turns of the superconductor in each of said layers thereof, said grease being soft and plastic at temperatures above that at which the superconductor exhibits superconductive properties and being hard and of good heat transfer properties compared to the superconductor material at temperatures below that at which said superconductor material exhibits superconductive properties.

5. A superconductive magnet as described in claim 4 in which a separate conductive sheet is positioned between each adjacent two layers of turns and includes an insulating film between each side thereof and the adjacent layer of turns, and in which shorting bars are provided between said layers and extending in a direction transverse to said turns, said shorting bars being in electrical contact with a plurality of turns of a layer of said superconductor winding.

References Cited

UNITED STATES PATENTS 3,223,896  12/1965  Smith ---------- 174—110 XR
3,281,737  10/1966  Swartz --------- 335—299 XR GEORGE HARRIS, *Primary Examiner.*